US012798283B2

(12) United States Patent
Chatzigrigoriou et al.

(10) Patent No.: US 12,798,283 B2
(45) Date of Patent: Nov. 17, 2026

(54) SOFT ELASTOMERIC SEAL FOR A WRITING INSTRUMENT

(71) Applicant: BIC Violex Single Member S.A., Anoixi (GR)

(72) Inventors: Nikolaos Chatzigrigoriou, Anoixi (GR); Polykarpos Psaropoulos, Anoixi (GR)

(73) Assignee: BIC Violex Single Member S.A., Anoixi (GR)

(*) Notice: Subject to any disclaimer, the term of this patent is extended or adjusted under 35 U.S.C. 154(b) by 282 days.

(21) Appl. No.: 18/704,376

(22) PCT Filed: Oct. 25, 2022

(86) PCT No.: PCT/EP2022/079700
§ 371 (c)(1),
(2) Date: Apr. 24, 2024

(87) PCT Pub. No.: WO2023/072895
PCT Pub. Date: May 4, 2023

(65) Prior Publication Data

US 2026/0152022 A1 Jun. 4, 2026

(30) Foreign Application Priority Data

Oct. 27, 2021 (EP) .................................... 21204980

(51) Int. Cl.
*B43K 5/17* (2006.01)
*B43K 23/12* (2006.01)

(52) U.S. Cl.
CPC ................ *B43K 5/17* (2013.01); *B43K 23/12* (2013.01)

(58) Field of Classification Search
CPC . B43K 5/17; B43K 23/12; B43K 5/16; B43K 24/02; B43K 24/08
(Continued)

(56) References Cited

U.S. PATENT DOCUMENTS 4,533,272 A 8/1985 Sakai
4,759,650 A 7/1988 Granoff
(Continued)

FOREIGN PATENT DOCUMENTS

JP 2008006661 A 1/2008
JP 2008006662 A 1/2008
(Continued)

OTHER PUBLICATIONS

Search Report and Written Opinion issued in International Application No. PCT/EP2022/079700, mailed Dec. 22, 2022.
(Continued)

*Primary Examiner* — David J Walczak
(74) *Attorney, Agent, or Firm* — Bookoff McAndrews, PLLC

(57) ABSTRACT

A writing instrument comprising a tubular body having an orifice at a distal end, a reservoir for storing writing ink arranged proximally to the orifice, and a nib in fluid communication with the reservoir. The nib is axially translatable within the tubular body between a retracted position and an extended position in which the nib protrudes through the orifice. An actuating means translates the nib between the retracted and extended positions. A seal component located at or adjacent to the orifice seals the nib and reservoir from the environment when the nib is retracted. The seal component is configured to be penetrated by the nib or torn by a piercing mechanism when the nib is translated to the extended position. The seal component comprises an elastomeric material having a Shore A hardness of less than 25.

20 Claims, 1 Drawing Sheet

(58) Field of Classification Search
USPC ........................... 401/99, 107, 108, 198, 199
See application file for complete search history.

(56) References Cited

U.S. PATENT DOCUMENTS

| | | | |
|---|---|---|---|
| 5,092,701 A | | 3/1992 | Lai |
| 5,207,523 A | | 5/1993 | Wittek |
| 5,823,697 A | | 10/1998 | Talbot |
| 6,033,141 A | | 3/2000 | Blaustein et al. |
| 6,135,660 A | | 10/2000 | Stevens et al. |
| 10,493,790 B2 | | 12/2019 | Cunningham |
| 2004/0042838 A1 | | 3/2004 | Lewis et al. |
| 2005/0084320 A1 | * | 4/2005 | Carroll .................. B43K 8/028 401/107 |
| 2006/0147248 A1 | | 7/2006 | Fukui et al. |
| 2020/0282762 A1 | | 9/2020 | Rolion et al. |

FOREIGN PATENT DOCUMENTS

| | | |
|---|---|---|
| JP | 2008006663 A | 1/2008 |
| JP | 2008188781 A | 8/2008 |
| KR | 100734903 B1 | 7/2007 |
| WO | 2004009374 A2 | 1/2004 |

OTHER PUBLICATIONS

Sheth, S. (Nov. 6, 2018). The vacuum-based sketch marker that promises to never dry up!—Yanko Design. Modern Industrial Design News. https://www.yankodesign.com/2018/09/24/the-vacuum-based-sketch-marker-that-promises-to-never-dry-up/.

Gooch, "Encyclopedic Dictionary of Polymers," Springer, 2007, xviii + 1238 pages, ISBN 978-0-387-31021-3.

* cited by examiner

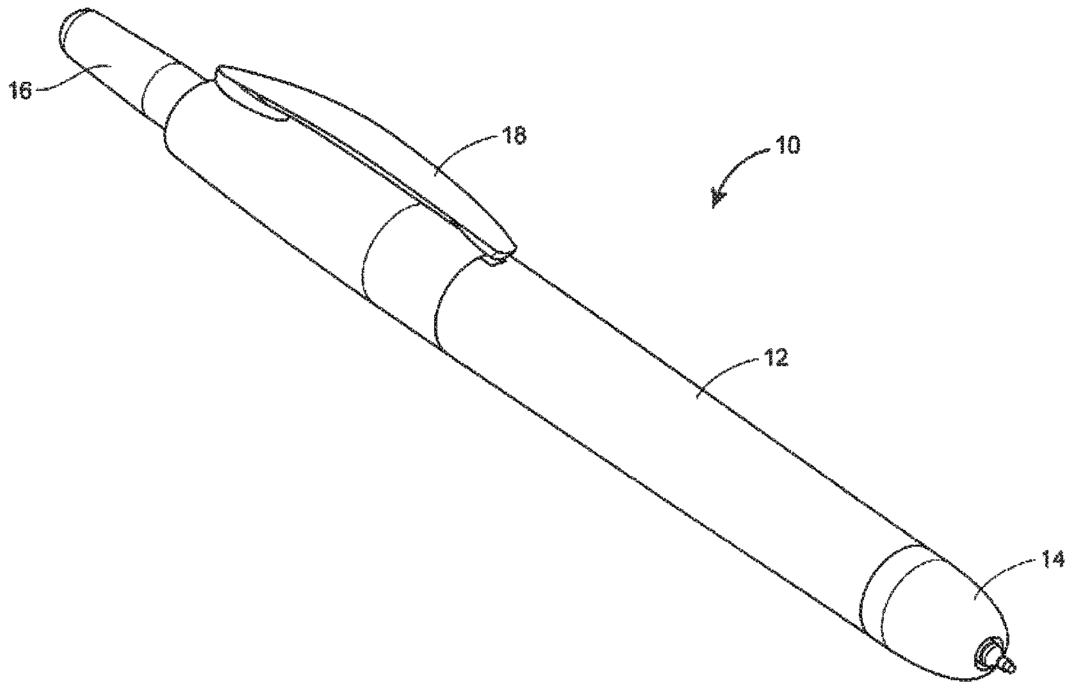
16
18
10
12
14

SOFT ELASTOMERIC SEAL FOR A WRITING INSTRUMENT

CROSS-REFERENCE TO RELATED APPLICATIONS

This is a National Stage Application under 35 U.S.C. § 371 of International Application No. PCT/EP2022/079700, filed Oct. 25, 2022, now published as WO 2023/072895 A1, which claims priority to European Patent Application No. 21204980.3, filed Oct. 27, 2021, the entireties of which are incorporated herein by reference.

TECHNICAL FIELD

The present disclosure relates to the field of writing devices. More specifically, the present disclosure relates to writing devices that dispense volatile inks, such as felt tip markers and the like.

BACKGROUND

The present disclosure relates to writing instruments that dispense volatile inks, such as felt tip markers, highlighter, non-permanent and permanent markers, and the like. Commonly, felt pens comprise a writing tip in the form of a nib and a cap to close off the nib. The nib is typically kept wet by the ink used for writing. Closing of the nib may be necessary to prevent the solvents of the ink from evaporating which would lead to the nib drying out within a few hours. A dried out nib may impair the writing quality of the nib or render the entire felt pen irreversibly useless. Further, an uncovered nib can lead to unintentional stains on surfaces, e.g. clothes or skin of the user. Also, it may be tedious for the user to recap a felt pen after every use, especially when drawing with multiple colors. Further, a cap may be displaced leading to the nib drying out.

More recently, retractable felt pens have been developed. However, such retractable felt pens may require a sealing chamber which needs to comprise a complex mechanism to open and close every time the nib is slid in or out. A solution to this may be the use of self-healing films that prevent evaporation of solvents when the nib is in its retracted position. When the nib is moved to the extended position the self-healing film may be penetrated. Subsequently, when the nib moves back to its retracted position the self-healing film may reseal the sealing chamber without the need for a complex mechanism. However, the material for self-healing films may be costly.

The present disclosure aims to address one or more problems in the prior art.

SUMMARY

In a first aspect, the first disclosure relates to a writing instrument comprising a tubular body. The tubular body terminates in a writing orifice at the distal end of the tubular body. It should be understood that when the present disclosure refers to the distal end as the end comprising the end utilized for dispensing the ink of the writing instruments. Accordingly, the proximal end is the end of the writing instrument which is opposite to the distal end. The same applies to the proximal and distal ends of the tubular body. The writing instrument further comprises a reservoir for storing a writing ink which is arranged proximally to the writing orifice. The writing instrument further comprises a nib arranged distally to the reservoir and in fluid communication with the reservoir. The nib is configured to be axially translatable within the tubular body between a first retracted position in which the nib is positioned within the tubular body and not protruding through the writing orifice and a second extended position in which the nib protrudes through the writing orifice.

The writing instrument further comprises an actuating means for axially translating the nib within the tubular body between the first retracted position and the second extended position for writing. The second extended position is a position for writing, i.e. a position in which nib protrudes sufficiently through the writing orifice to be able to dispense ink when used by the user.

The writing instrument further comprises a seal component. The seal component is located within the tubular body at or adjacent to the writing orifice. The seal component seals the nib and the reservoir from exposure to the environment in the first retracted position. Further, the seal component is configured to be penetrated by the nib or torn by a piercing mechanism when the nib is advanced into the second extended position for writing.

The seal component comprises an elastomeric material. The elastomeric material has a Shore A hardness of less than about 25.

In some embodiments, the elastomeric material may have a shore A hardness of less than about 20, more specifically less than about 10, and in particular about 0.

In some embodiments, the elastomeric material may have a shore 00 hardness of less than 50, more specifically less than 40, and in particular less than 30.

In some embodiments, the seal component may be configured to be penetrated by stretching the seal component beyond the elastomeric material's elongation at break when the nib is advanced into the second extended position.

In some embodiments, the elastomeric material may have an elongation at break between about 200% and 1200%, more specifically between about 400% and about 1000% and in particular between about 550% and 850%, measured according to DIN 53504:2017-03 with a specimen of the type S3A.

In some embodiments, the seal component may be configured to be penetrated under formation of an opening when the nib is advanced into the second extended position.

In some embodiments, the seal component may be configured to be stretched thin when the nib is advanced into the second extended position such that a user of the writing instrument is able to tear or rub an opening into the sealing component at the point where the tip of the nib contacts the sealing component when the user starts writing on a substrate, in particular a paper.

In some embodiments, the elastomeric material of the seal component may retain at least about 80%, more specifically at least about 90% and in particular at least about 95%, of its elastic recovery after being stretched to 90% of its elongation at break.

In some embodiments, the sealing component elastomeric material of the seal component may retain at least about 80%, more specifically at least about 90% and in particular at least about 95%, of its elastic recovery after being subjected to 50 cycles, more specifically 200 cycles, and in particular 500 cycles, of axially translating the nib to the second extended position, followed by axially translating the nib back to the first retracted position.

In some embodiments, the seal component may be configured to substantially close or close the opening when the nib is retracted to the first retracted position.

In some embodiments, the elastomeric material may have a tensile strength of less than 7 N/mm$^2$, more specifically less than 3.5 N/mm$^2$, and in particular less than 2 N/mm$^2$, measured according to DIN 53504:2017-03.

In some embodiments, the elastomeric material may have a tear strength of less than 20 N/mm, more specifically less than 10 N/mm, and in particular less than 7 N/mm.

In some embodiments, the elastomeric material may comprise a thermoplastic elastomer.

In some embodiments, the thermoplastic elastomer may comprise a styrenic block copolymer, thermoplastic polyolefin elastomers, thermoplastic vulcanizates, thermoplastic polyurethanes, thermoplastic copolyesters, thermoplastic polyamides and in particular styrenic block copolymers.

In some embodiments, the elastomeric material may comprise a silicone, more specifically a silicone rubber.

In some embodiments, the elastomeric material may comprise cross-links.

In some embodiments, the elastomeric material may comprise a plasticizer, in particular a paraffinic oil.

In some embodiments, the elastomeric material may comprise the plasticizer relative to the total weight of the elastomeric material in an amount between about 0.5 wt.-% to about 60 wt.-%, more specifically between 5 wt.-% to about 50 wt.-%, in particular 10 wt.-% to about 30 wt.-%, relative to the total weight of the elastomeric material.

In some embodiments, the sealing component may have a thickness between about 0.1 mm to about 5 mm, more specifically between about 0.5 mm to about 3.5 mm and in particular between about 1.5 mm and about 2.5 mm.

In some embodiments, the sealing component may comprise no predetermined breaking points or lines.

In some embodiments, the sealing component may comprise a predetermined breaking point, in particular a predetermined breaking point located in an area where the tip of the nib contacts the sealing component in the second extended position.

In some embodiments, the seal component may be torn by a piercing mechanism when the nib is advanced into the second extended position for writing for the first time.

In some embodiments, the nib may be made of a fibrous or porous material.

In some embodiments, the writing instrument may be a felt pen, a highlighter, or a permanent or non-permanent marker.

In some embodiments, the seal component may be disc-shaped.

In some embodiments, the seal component may be hemispherical or bell-shaped.

In a second aspect, a method for manufacturing the seal component as defined in any of the preceding embodiments, wherein the elastomeric material is injection molded to obtain the seal component.

In some embodiments, the elastomeric material may be in solid form prior to the injection molding.

In some embodiments, the elastomeric material may be extruded to obtain a seal component rod, and the rod may be cut into seal components.

In some embodiments, the component may be manufactured by additive manufacturing, in particular by stereolithography, powder bed fusion, fused filament fabrication or liquid additive manufacturing.

In some embodiments, the elastomeric material may be overmolded into the writing instrument's writing orifice.

DETAILED DESCRIPTION

FIG. 1. is a perspective view of a writing instrument according to an embodiment of the present disclosure.

DETAILED DESCRIPTION

Hereinafter, a detailed description will be given of the present disclosure. The terms or words used in the description and the aspects of the present disclosure are not to be construed limitedly as only having common-language or dictionary meanings and should, unless specifically defined otherwise in the following description, be interpreted as having their ordinary technical meaning as established in the relevant technical field. The detailed description will refer to specific embodiments to better illustrate the present disclosure, however, it should be understood that the presented disclosure is not limited to these specific embodiments.

In a first aspect, the first disclosure relates to a writing instrument (10) comprising a tubular body (12, 14). The tubular body (12, 14) terminates in a writing orifice at the distal end of the tubular body (12, 14). It should be understood that when the present disclosure refers to the distal end as the end comprising the end utilized for dispensing the ink of the writing instruments (10). Accordingly, the proximal end is the end of the writing instrument (10) which is opposite to the distal end. The same applies to the proximal and distal ends of the tubular body (12, 14). The writing instrument (10) further comprises a reservoir for storing a writing ink which is arranged proximally to the writing orifice. The writing instrument (10) further comprises a nib arranged distally to the reservoir and in fluid communication with the reservoir. The nib is configured to be axially translatable within the tubular body (12, 14) between a first retracted position in which the nib is positioned within the tubular body (12, 14) and not protruding through the writing orifice and a second extended position in which the nib protrudes through the writing orifice.

The writing instrument (10) further comprises an actuating means for axially translating the nib within the tubular body (12, 14) between the first retracted position and the second extended position for writing. The second extended position is a position for writing, i.e. a position in which nib protrudes sufficiently through the writing orifice to be able to dispense ink when used by the user.

The writing instrument (10) further comprises a seal component. The seal component is located within the tubular body (12, 14) at or adjacent to the writing orifice. The seal component seals the nib and the reservoir from exposure to the environment in the first retracted position. Further, the seal component is configured to be penetrated by the nib or torn by a piercing mechanism (which will be described later) when the nib is advanced into the second extended position for writing.

The seal component comprises an elastomeric material. The elastomeric material has a Shore A hardness of less than about 25.

The nib is configured to be axially translatable within the tubular body (12, 14) between a first retracted position in which the nib is positioned within the tubular body (12, 14) and not protruding through the writing orifice and a second extended position in which the nib protrudes through the writing orifice. The second extended position is the position for writing, i.e. a position in which nib protrudes sufficiently through the writing orifice to be able to dispense ink when used by the user. In FIG. 1, the second extended position is shown in which the nib protrudes through the writing orifice.

The writing instrument (10) further comprises an actuating means for axially translating the nib within the tubular body (12, 14) between the first retracted position and the second extended position. In the sense of the present disclosure, axial translation refers to a movement along the longitudinal axis of the tubular body (12, 14). The actuating means may comprise multiple components. In some embodiments, the actuating means may comprise a push button (16) which is arranged at the distal end of the tubular body (12, 14). FIG. 1 further features a clip (18) for affixing the writing instruments (10) to a substrate such as a clip board or a pocket. In some embodiments, the actuating means may comprise such a clip (18) which is then slidably or rotatably arranged at the distal end of the tubular body (12, 14) and configured to directly or indirectly axially translate the nib. In still other embodiments, the actuating means may be a circular element arranged on or in the tubular body (12, 14) which is configured to directly or indirectly axially translate the nib by rotating or sliding the circular element. In some embodiments, a spring may be arranged inside or outside the tubular body (12, 14), in particular to provide a means for reversing the axial translation provided by the actuating means. In some embodiment, the writing instruments (10) may further comprise a spring for axially translating the nib within the tubular body (12, 14) from the second extended position to the first retracted position. In FIG. 1, such a spring may be located within tubular body (12, 14) and configured to cooperate with push button (16) to provide the axial translations of the nib in the proximal and distal directions.

The writing instrument (10) further comprises a seal component. The seal component is located within the tubular body (12, 14) at or adjacent to the writing orifice. In FIG. 1, the seal component is located within the tip component (14). The seal component seals the nib and the reservoir from exposure to the environment in the first retracted position. The seal component is configured to be penetrated when the nib is advanced into the second extended position for writing. In some embodiments, the seal component is configured to be penetrated by the nib itself. The nib tears the seal component, when the nib is axially translated into second extended position for the first time.

The writing instrument (10) as defined above may prevent the nib from drying out. In particular, the elastomeric material comprised within the seal component may exert a restoring force upon itself and/or the seal component. Due to the restoring force, the seal component may return substantially to its prior geometry after being penetrated, thereby substantially resealing the nib and/or reservoir from exposure to the environment.

The seal component as defined above does not comprise opening or slits prior to penetration. A seal component which is configured to be penetrated under formation of an opening when the nib is axially translated into the second extended position for the first time may provide a longer storage lifetime, compared to a seal component comprising for example pre-slitted sealing component, as the seal component may provide an increased impermeability compared to a pre-slitted sealing component.

In some embodiments, the seal component may be configured to be penetrated under formation of an opening when the nib is advanced into the second extended position. In some embodiments, the seal component may be configured to substantially close or close the opening when the nib is retracted to the first retracted position. As a result, the writing instrument (10) can be used for writing by advancing the nib into the second extended position, while the nib protected from drying out when retracted to the first retracted position, as the opening is substantially closed or closed. The opening may be considered closed when the sealing property of the seal component is regained to such an extent that the time for drying out of the writing instruments (10) is prolonged by a factor of at least about 5, specifically at least about 10, more specifically at least about 15, and in particular at least about 20, in comparison to the same writing instrument (10) in which the nib being is kept in the second extended position under otherwise identical storage conditions (e.g. about 25° C. at about 40% relative humidity). The time span until the writing instruments (10) is dried out may be determined by any suitable means. One example may be the loss of the writing instruments (10) ability to write an uninterrupted clean line. In some embodiments, "substantially closed" may refer to the user having a slight visual indication of the opening (i.e. nib penetration). The visual indication may depend on the nib diameter, the color and/or transparency of the seal component, the color of the nib and/or the seal elasticity.

In some embodiments, the seal component may be configured to be stretched thin when the nib is advanced into the second extended position such that a user of the writing instrument (10) is able to tear or rub an opening into the sealing component at the point where the tip of the nib contacts the sealing component when the user starts writing on a substrate, in particular a paper.

In some embodiments, the elastomeric material may have a shore A hardness of less than about 20, more specifically less than about 10, and in particular about 0.

In some embodiments, the elastomeric material may have a shore 00 hardness of less than 50, more specifically less than 40, and in particular less than 30. The method of determining the hardness of the elastomeric material is not particularly limited. For instance, it is possible to determine the hardness according to DIN ISO 48-4:2021-02.

A seal component comprising an elastomeric material with a lower hardness may require less force to be penetrated, compared to a seal component comprising an elastomeric material with a higher hardness. A seal component with an increased hardness may provide a stronger restoring force. An elastomeric material with a lower hardness may provide increased impermeability as the edges of the elastomeric material may exhibit improved realignment after penetration, compared to a harder elastomeric material. Further, an elastomeric material with lower hardness may allow using a sealing component with a higher thickness, which still allows penetration. A sealing component with a higher thickness may lead to an improved sealing. The hardness of the elastomeric material may also be the hardness of the seal component.

In some embodiments, the seal component may be configured to be penetrated by stretching the seal component beyond the elastomeric material's elongation at break when the nib is advanced into the second extended position. A seal component configured to be penetrated by stretching the seal component beyond the elastomeric material's elongation a break may allow using the translation of the nib for penetration of the seal component, making an additional penetration mechanism obsolete.

In some embodiments, the elastomeric material may have an elongation at break between about 200% and 1200%, more specifically between about 400% and about 1000% and in particular between about 550% and 850%, measured according to DIN 53504:2017-03 with a specimen of the type S3A. An increased elongation at break of the elastomeric material may prevent an unintentional penetration or tearing of the seal component during storage, e.g. by contact with foreign objects. On the other hand, an increased elongation at break may also increase the required translation of the nib through the seal component until it tears.

In some embodiments, the elastomeric material of the seal component may retain at least about 80%, more specifically at least about 90% and in particular at least about 95%, of its elastic recovery after being stretched to 90% of its elongation at break. The term "elastic recovery" within this disclosure is not particularly limited and i.a. refers to its common meaning in the art, e.g. as established in Jan W. Gooch (ed.), Encyclopedic Dictionary of Polymers, 2007, page 344, entry "Elastic Recovery". Additionally or alternatively, the term may refer to a material's ability to substantially or fully return to its original shape after stretching.

In some embodiments, the sealing component elastomeric material of the seal component may retain at least about 80%, more specifically at least about 90% and in particular at least about 95%, of its elastic recovery after being subjected to 50 cycles, more specifically 200 cycles, and in particular 500 cycles, of axially translating the nib to the second extended position, followed by axially translating the nib back to the first retracted position.

In some embodiments, the elastomeric material may have a tensile strength of less than 7 $N/mm^2$, more specifically less than 3.5 $N/mm^2$, and in particular less than 2 $N/mm^2$, measured according to DIN 53504:2017-03. An increased tensile strength of the elastomeric material may provide a seal component with an increased restoring force. On the other hand, an increased tensile strength may also increase the required force to translate of the nib through the seal component, in particular the first time.

In some embodiments, the elastomeric material may have a tear strength of less than 20 N/mm, more specifically less than 10 N/mm, and in particular less than 7 N/mm. The method of determining the tear strength of the elastomeric material is not particularly limited. For instance, it is possible to determine the tear strength according to ISO 37. An increased tear strength of the elastomeric material may prevent an unintentional penetration or tearing of the seal component during storage, e.g. by contact with foreign objects. On the other hand, an increased tensile strength may also increase the required force to translate of the nib through the seal component, in particular the first time.

In some embodiments, the elastomeric material may comprise a thermoplastic elastomer. The term "thermoplastic elastomer" within this disclosure is not particularly limited and i.a. refers to its common meaning in the art, e.g. as established in Jan W. Gooch (ed.), Encyclopedic Dictionary of Polymers, 2007, page 975, entry "Thermoplastic Elastomer". Additionally or alternatively, the term may refer to a thermoplastic polymer that can be repeatedly stretched to at least twice its initial length with at least 80% recovery.

In some embodiments, the thermoplastic elastomer may comprise a styrenic block copolymer, thermoplastic polyolefin elastomers, thermoplastic vulcanizates, thermoplastic polyurethanes, thermoplastic copolyesters, thermoplastic polyamides and in particular styrenic block copolymers.

In some embodiments, the elastomeric material may comprise a silicone. In some embodiment, the elastomeric material may comprise a silicone rubber. In some embodiments, the elastomeric material may comprise Silicone A-588, sold by the company Factor II Inc., Lakeside, USA. As another example, the elastomeric material may comprise Silicone LIM*6010, sold by the company Momentive Performance Materials GmbH, Leverkusen, Germany.

In some embodiments, the elastomeric material may comprise cross-links. In particular, the elastomeric material may comprise a polymer, wherein the polymer is cross-linked wide-meshed. Wide-meshed polymers may still show thermoplastic properties, such as meltability.

In some embodiments, the elastomeric material may comprise a plasticizer, in particular a paraffinic oil. Plasticizers may be added to materials to make them softer, more flexible and/or increase the materials plasticity. Within the present disclosure, plasticizers may be added to the elastomeric material to reduce its hardness.

In some embodiments, the elastomeric material may comprise the plasticizer relative to the total weight of the elastomeric material in an amount between about 0.5 wt.-% to about 60 wt.-%, more specifically between 5 wt.-% to about 50 wt.-%, in particular 10 wt.-% to about 30 wt.-%, relative to the total weight of the elastomeric material. The amount of plasticizer may be adjusted based on the desired hardness of the elastomeric material.

In some embodiments, the sealing component may have a thickness between about 0.1 mm to about 5 mm, more specifically between about 0.5 mm to about 3.5 mm and in particular between about 1.5 mm and about 2.5 mm. A higher thickness may provide a seal component which has improved sealing properties. However, a high thickness may also increase the required force to penetrate the sealing component, in particular the first time.

In some embodiments, it may be particularly advantageous that the sealing component comprises no predetermined breaking points or lines. A sealing component comprising no predetermined breaking point or lines may be advantageous since it may be manufactured cost-efficiently. Furthermore, a sealing component comprising no predetermined breaking points or lines may reseal the seal, the nib and/or reservoir more efficiently, compared to a sealing component comprising predetermined breaking points or lines.

In some embodiments, the sealing component may comprise a predetermined breaking point, in particular a predetermined breaking point located in an area where the tip of the nib contacts the sealing component in the second extended position. A breaking point of breaking line is an area where a rupture preferentially occurs. In some embodiments, it may be particularly advantageous that the one or more predetermined breaking points or lines have a reduced thickness in comparison to other areas of the seal component.

In some embodiments, the seal component may be torn by a piercing mechanism when the nib is advanced into the second extended position, notably wherein the piercing mechanism is part of the writing instrument, and more specifically located in the writing instrument, and is activated at least when the nib is advanced into the second extended position for writing for the first time. In some embodiments, the seal component may be torn by a piercing mechanism when the nib is advanced into the second extended position for writing for the first time. In particular when the nib is made of a softer material, the seal may be configured to be torn by a piercing mechanism to protect the nib.

In some embodiments, the actuating means for axially translating the nib within the tubular body (12, 14) between the first retracted position and the second extended position may also actuate the piercing mechanism. In some embodiments, it may be particularly advantageous that the writing instrument (10) comprises a tubular piercing mechanism which is arranged radially outward of the nib, which is actuated together with the nib, which is configured to be pierce the seal component before the nib contacts the seal component and which is configured to stop its movement into the distal direction prior to the nib reaching the second extended position. The latter feature ensures that the piercing mechanism does not impede writing with the nib. It can, for example, be implemented by providing the actuating means with a stop element which is blocks further axial advancement of the piercing mechanism after having pierced the seal.

In some embodiments, the nib may be made of a fibrous or porous material.

In some embodiments, the writing instrument (10) may be a felt pen, a highlighter, or a permanent or non-permanent marker.

In some embodiments, the seal component may be disc-shaped. A disc-shaped seal component may be advantageous as it may be cost-efficiently manufacturable Further, a disc-shaped seal component may provide increased closure of the formed opening when the nib is retracted into the first position.

In some embodiments, the seal component may be hemispherical or bell-shaped.

In a second aspect, a method for manufacturing the seal component as defined in any of the preceding embodiments, wherein the elastomeric material is injection molded to obtain the seal component.

Injection molding the seal component may be an efficient, cost-saving process for manufacturing.

In some embodiments, the elastomeric material may be in solid form prior to the injection molding.

In some embodiments, the elastomeric material may be extruded to obtain a seal component rod, and the rod may be cut into seal components.

In some embodiments, the seal component may be manufactured by additive manufacturing, in particular by stereolithography, powder bed fusion, fused filament fabrication or liquid additive manufacturing. Manufacturing of the seal com In some embodiments, the elastomeric material may be overmolded into the writing instruments (10) writing orifice.

The present application furthermore relates to the following aspects.

Aspects

1. A writing instrument comprising:
   - a tubular body terminating in a writing orifice at the distal end of the tubular body;
   - a reservoir for storing a writing ink which is arranged proximally to the writing orifice;
   - a nib arranged distally to the reservoir and in fluid communication with the reservoir,
   - wherein the nib is configured to be axially translatable within the tubular body between a first retracted position in which the nib is positioned within the tubular body and not protruding through the writing orifice and a second extended position in which the nib protrudes through the writing orifice;
   - an actuating means for axially translating the nib within the tubular body between the first retracted position and the second extended position for writing; and
   - a seal component located within the tubular body at or adjacent to the writing orifice which seals the nib and the reservoir from exposure to the environment in the first retracted position,
   - wherein the seal component is configured to be penetrated by the nib or torn by a piercing mechanism when the nib is advanced into the second extended position for writing,
   - wherein the seal component comprises an elastomeric material and wherein the elastomeric material has a Shore A hardness of less than about 25.
2. The writing instrument according to aspect 1, wherein the elastomeric material has a shore A hardness of less than about 20, more specifically less than about 10, and in particular about 0.
3. The writing instrument according to aspect 1 or aspect 2, wherein the elastomeric material has a shore OO hardness of less than 50, more specifically less than 40, and in particular less than 30.
4. The writing instrument according to any preceding aspect, wherein the seal component is configured to be penetrated by stretching the seal component beyond the elastomeric material's elongation at break when the nib is advanced into the second extended position.
5. The writing instrument according to any preceding aspect, wherein the elastomeric material has an elongation at break between about 200% and 1200%, more specifically between about 400% and about 1000% and in particular between about 550% and 850%.
6. The writing instrument according to any preceding aspect, wherein the seal component is configured to be penetrated under formation of an opening when the nib is advanced into the second extended position.
7. The writing instrument according to any of aspects 1 to 5, wherein the seal component is configured to be stretched thin when the nib is advanced into the second extended position such that a user of the writing instrument is able to tear or rub an opening into the sealing component at the point where the tip of the nib contacts the sealing component when the user starts writing on a substrate, in particular a paper.
8. The writing instrument according to any preceding aspect, wherein the elastomeric material of the seal component retains at least about 80%, more specifically at least about 90% and in particular at least about 95%, of its elastic recovery after being stretched to 90% of its elongation at break.
9. The writing instrument according to any preceding aspect, wherein the sealing component elastomeric material of the seal component retains at least about 80%, more specifically at least about 90% and in particular at least about 95%, of its elastic recovery after being subjected to 50 cycles, more specifically 200 cycles, and in particular 500 cycles, of axially translating the nib to the second extended position, followed by axially translating the nib back to the first retracted position.
10. The writing instrument according to any of aspects 6 to 9, wherein the seal component is configured to substantially close or close the opening when the nib is retracted to the first retracted position.
11. The writing instrument according to any preceding aspect, wherein the elastomeric material has a tensile strength of less than 7 $N/mm^2$, more specifically less than 3.5 $N/mm^2$, and in particular less than 2 $N/mm^2$.
12. The writing instrument according to any preceding aspect, wherein the elastomeric material has a tear strength of less than 20 N/mm, more specifically less than 10 N/mm, and in particular less than 7 N/mm.

13. The writing instrument according to any preceding aspect, wherein the elastomeric material comprises a thermoplastic elastomer.
14. The writing instrument according to any preceding aspect, wherein the thermoplastic elastomer comprises a styrenic block copolymer, thermoplastic polyolefin elastomers, thermoplastic vulcanizates, thermoplastic polyurethanes, thermoplastic copolyesters, thermoplastic polyamides and in particular styrenic block copolymers.
15. The writing instrument according to any preceding aspect, wherein the elastomeric material comprises a silicone, more specifically a silicone rubber.
16. The writing instrument according to any preceding aspect, wherein the elastomeric material comprises cross-links.
17. The writing instrument according to any preceding aspect, wherein the elastomeric material comprises a plasticizer, in particular a paraffinic oil.
18. The writing instrument according to any preceding aspect, wherein the elastomeric material comprises the plasticizer relative to the total weight of the elastomeric material in an amount between about 0.5 wt.-% to about 60 wt.-%, more specifically between 5 wt.-% to about 50 wt.-%, in particular 10 wt.-% to about 30 wt.-%, relative to the total weight of the elastomeric material.
19. The writing instrument according to any preceding aspect, wherein the sealing component has a thickness between about 0.1 mm to about 5 mm, more specifically between about 0.5 mm to about 3.5 mm and in particular between about 1.5 mm and about 2.5 mm.
20. The writing instrument according to any preceding aspect, wherein the sealing component comprises no predetermined breaking points or lines.
21. The writing instrument according to any one of aspects 1 to 19, wherein the sealing component comprises a predetermined breaking point, in particular a predetermined breaking point located in an area where the tip of the nib contacts the sealing component in the second extended position.
22. The writing instrument according to any preceding aspect, wherein the seal component is torn by a piercing mechanism when the nib is advanced into the second extended position for writing for the first time, more specifically wherein the piercing mechanism is part of the writing instrument, and more specifically located in the writing instrument, and is activated at least when the nib is advanced into the second extended position for writing for the first time.
23. The writing instrument according to any preceding aspect, wherein the nib is made of a fibrous or porous material.
24. The writing instrument according to any preceding aspect, wherein the writing instrument is a felt pen, a highlighter, or a permanent or non-permanent marker.
25. The writing instrument according to any preceding aspect, wherein the seal component is disc-shaped.
26. The writing instrument according to any one of aspects 1 to 24, wherein the seal component is hemispherical or bell-shaped.
27. A method for manufacturing the seal component as defined in any of the preceding aspects, wherein the elastomeric material is injection molded to obtain the seal component.
28. The method for manufacturing the seal component according to aspect 27, wherein the elastomeric material is in solid form prior to the injection molding.
29. A method for manufacturing the seal component as defined in any one of aspects 1 to 26,
   wherein the elastomeric material is extruded to obtain a seal component rod; and wherein the rod is cut into seal components.
30. A method for manufacturing the seal component as defined in any one of aspects 1 to 26,
   wherein the seal component is manufactured by additive manufacturing, in particular by stereolithography, powder bed fusion, fused filament fabrication or liquid additive manufacturing.
31. A method for manufacturing the writing instrument according to any one of aspects 1 to 26,
   wherein the elastomeric material is overmolded into the writing instrument's writing orifice.

The invention claimed is:

1. A writing instrument comprising:

a tubular body having an orifice at a distal end of the tubular body;

a reservoir for storing a writing ink arranged proximally to the orifice;

a nib arranged distally to the reservoir and in fluid communication with the reservoir, wherein the nib is configured to be axially translatable within the tubular body between a retracted position in which the nib is not protruding through the orifice and an extended position in which the nib protrudes through the orifice;

an actuating means for axially translating the nib within the tubular body between the retracted position and the extended position; and a seal component located within the tubular body at or adjacent to the orifice, the seal component configured to seal the nib and the reservoir from exposure to an environment when the nib is in the retracted position, wherein the seal component is configured to be at least one of penetrated by the nib or torn by a piercing mechanism when the nib is translated to the extended position, wherein the seal component does not comprise an opening prior to penetration, wherein the seal component comprises an elastomeric material, and wherein the elastomeric material has a Shore A hardness of less than 25.

2. The writing instrument according to claim 1, wherein the elastomeric material has a shore A hardness of less than 20.

3. The writing instrument according to claim 1, wherein the elastomeric material has a shore A hardness of less than 10.

4. The writing instrument according to claim 1, wherein the elastomeric material has a shore OO hardness of less than 50.

5. The writing instrument according to claim 1, wherein the elastomeric material has a shore OO hardness of less than 40.

6. The writing instrument according to claim 1, wherein the seal component is configured to be penetrated when the elastomeric material is stretched beyond an elongation at break when the nib is translated to the extended position.

7. The writing instrument according to claim 6, wherein the seal component is configured to substantially close or close an opening when the nib is translated to the retracted position.

8. The writing instrument according to claim 1, wherein the elastomeric material has an elongation at break between 200% and 1200%.

9. The writing instrument according to claim 1, wherein the seal component is configured to be stretched when the nib is translated to the extended position such that a user of the writing instrument is able to open the seal component where a tip of the nib contacts the seal component when the user writes on a substrate.

10. The writing instrument according to claim 1, wherein the elastomeric material of the seal component retains at least 80% of the elastomeric material's elastic recovery after being stretched to 90% of the elastomeric material's elongation at break.

11. The writing instrument according to claim 1, wherein the elastomeric material comprises a thermoplastic elastomer.

12. The writing instrument according to claim 11, wherein the thermoplastic elastomer comprises at least one of a styrenic block copolymer, thermoplastic polyolefin elastomers, thermoplastic vulcanizates, thermoplastic polyurethanes, thermoplastic copolyesters, or thermoplastic polyamides.

13. The writing instrument according to claim 1, wherein the elastomeric material comprises a silicone.

14. The writing instrument according to claim 1, wherein the elastomeric material comprises a silicone rubber.

15. The writing instrument according to claim 1, wherein the seal component has a thickness between 0.1 mm to 5 mm.

16. The writing instrument according to claim 1, wherein the seal component comprises a predetermined breaking point.

17. A method for manufacturing the seal component as defined in claim 1, wherein the elastomeric material is injection molded or extruded.

18. A writing instrument comprising:

a tubular body having an orifice at a distal end of the tubular body;

a reservoir for storing a writing ink arranged proximally to the orifice;

a nib arranged distally to the reservoir and in fluid communication with the reservoir, wherein the nib is configured to be axially translatable within the tubular body between a retracted position in which the nib is not protruding through the orifice and an extended position in which the nib protrudes through the orifice;

an actuating means for axially translating the nib within the tubular body between the retracted position and the extended position; and a seal component located within the tubular body at or adjacent to the orifice, the seal component configured to seal the nib and the reservoir from exposure to an environment when the nib is in the retracted position, wherein the seal component is configured to be at least one of penetrated by the nib or torn by a piercing mechanism when the nib is translated to the extended position, wherein the seal component comprises an elastomeric material, wherein the seal component is configured to be penetrated when the elastomeric material is stretched beyond an elongation at break when the nib is translated to the extended position, and wherein the elastomeric material has a Shore A hardness of less than 25.

19. A writing instrument comprising:

a tubular body having an orifice at a distal end of the tubular body;

a reservoir for storing a writing ink arranged proximally to the orifice;

a nib arranged distally to the reservoir and in fluid communication with the reservoir, wherein the nib is configured to be axially translatable within the tubular body between a retracted position in which the nib is not protruding through the orifice and an extended position in which the nib protrudes through the orifice;

an actuating means for axially translating the nib within the tubular body between the retracted position and the extended position; and a seal component located within the tubular body at or adjacent to the orifice, the seal component configured to seal the nib and the reservoir from exposure to an environment when the nib is in the retracted position, wherein the seal component is configured to be at least one of penetrated by the nib or torn by a piercing mechanism when the nib is translated to the extended position, wherein the seal component is configured to be stretched when the nib is translated to the extended position such that a user of the writing instrument is able to open the seal component where a tip of the nib contacts the seal component when the user writes on a substrate, wherein the seal component comprises an elastomeric material, and wherein the elastomeric material has a Shore A hardness of less than 25.

20. The writing instrument according to claim 19, wherein the elastomeric material comprises a thermoplastic elastomer.

* * * * *